United States Patent [19]

Chatwin et al.

[11] 4,068,813
[45] Jan. 17, 1978

[54] VEHICLE TIE-DOWN METHOD AND APPARATUS

[75] Inventors: Maurice Stephen Chatwin, Seattle; George Zell Porter, Bellevue, both of Wash.

[73] Assignee: The Boeing Company, Seattle, Wash.

[21] Appl. No.: 727,496

[22] Filed: Sept. 28, 1976

[51] Int. Cl.$^2$ ................................................. B60P 7/00
[52] U.S. Cl. ........................... 248/119 R; 105/368 R; 206/335; 280/179 R
[58] Field of Search ............... 105/368 R, 368 T, 477; 206/335; 248/119 R; 280/179 R

[56] References Cited

U.S. PATENT DOCUMENTS

| 3,691,963 | 9/1972 | Krokos et al. | 105/368 R |
|---|---|---|---|
| 3,869,144 | 3/1975 | Cwycyshyn | 105/368 R |
| 3,941,064 | 3/1976 | Choly | 105/368 R |

Primary Examiner—James C. Mitchell
Attorney, Agent, or Firm—Daniel T. Anderson; Bernard A. Donahue; Robert W. Jenny

[57] ABSTRACT

A tie-down method and apparatus are disclosed which facilitate automated, resilient securing of wheeled vehicles to shipping pallets or the floors of containers. Four links are detachably pivoted to the vehicle frame. Rollers at the lower ends of the links engage rails on the pallet or floor as the vehicle is moved into place by cooperating support equipment. The forward rollers engage spring loaded stops carried by the rails. The aft rollers are forced along the rails toward the forward rollers and the angling of the links compresses the vehicle springs and tires and the spring loaded stops. Lockstops are set in place behind the rear rollers to secure the vertically and longitudinally resilient tie-down.

7 Claims, 11 Drawing Figures

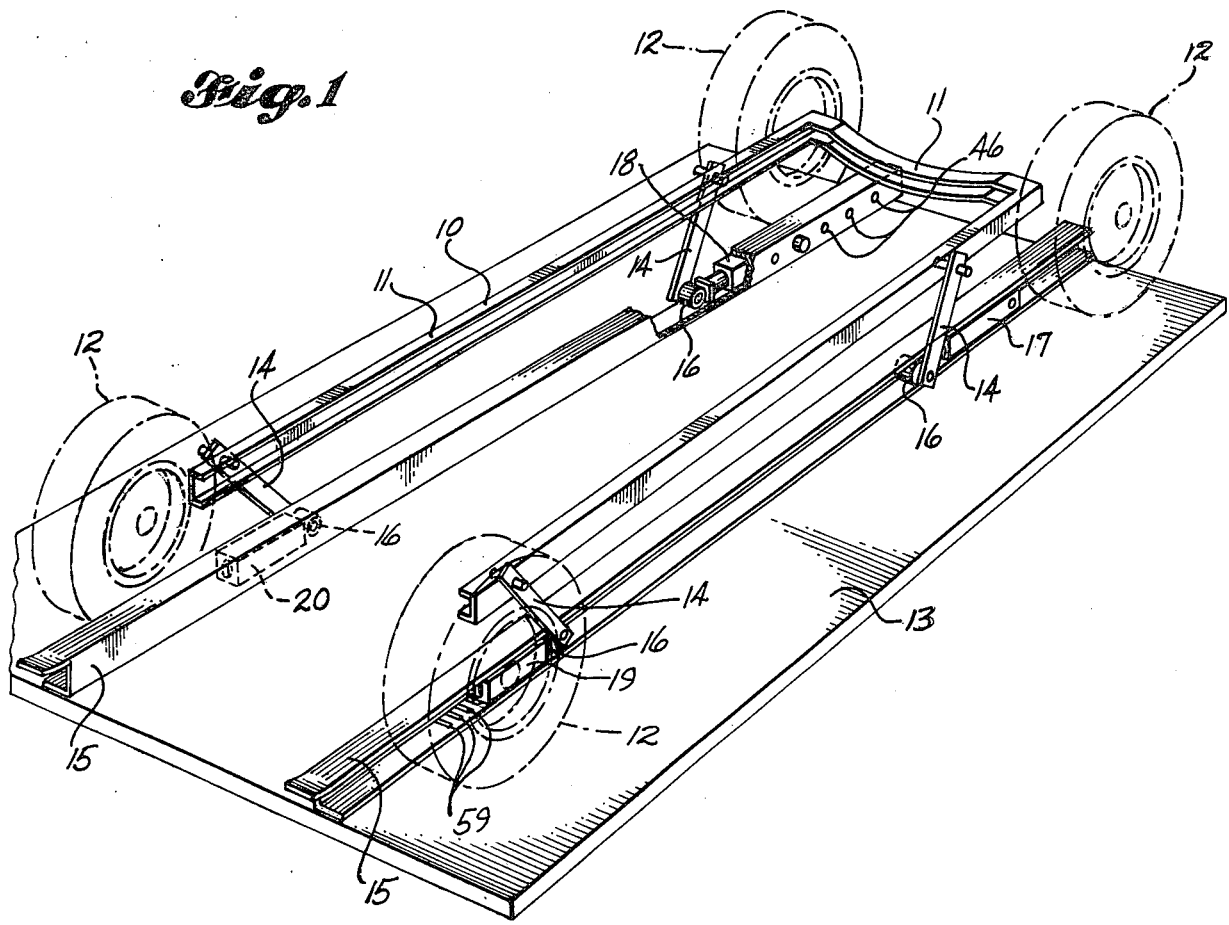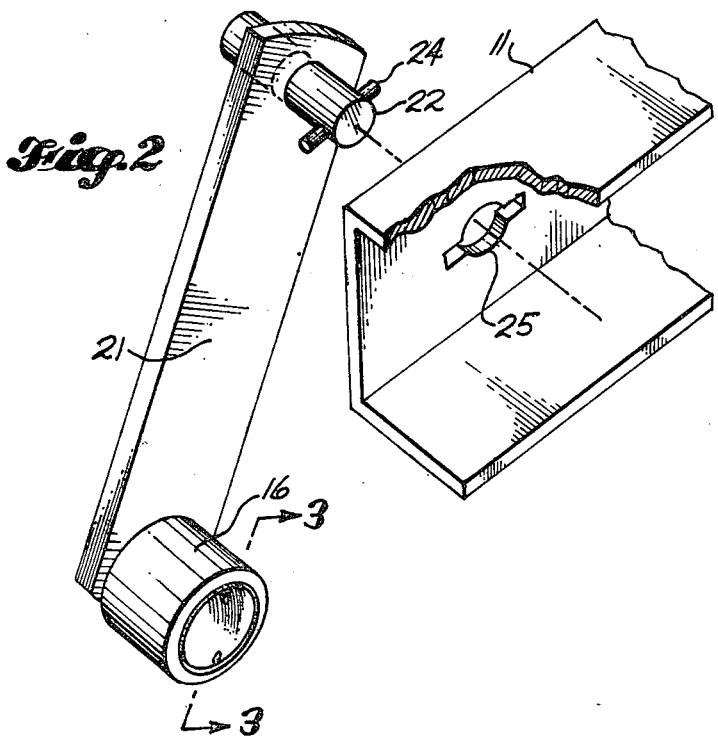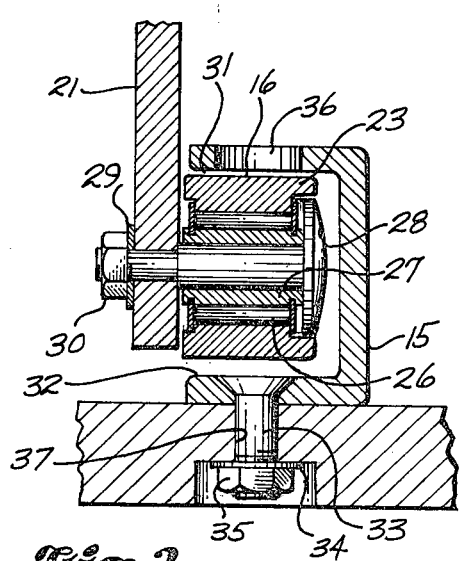

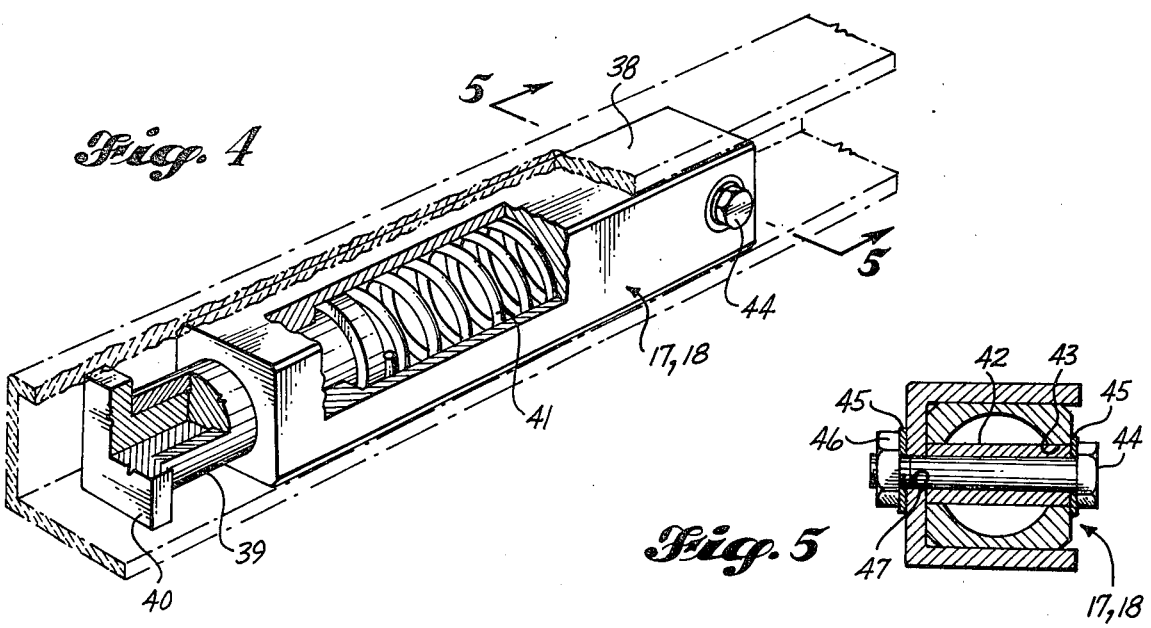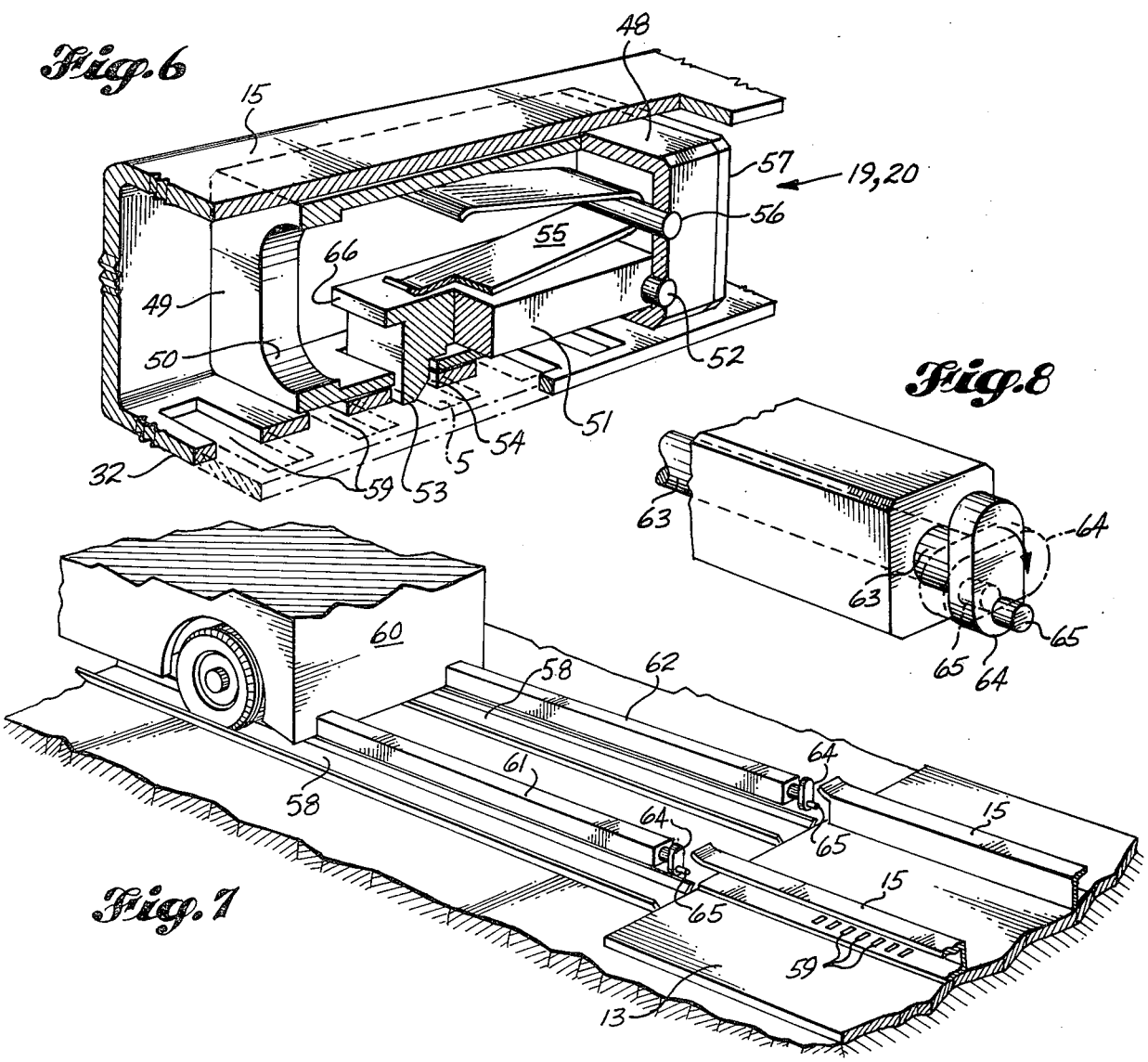

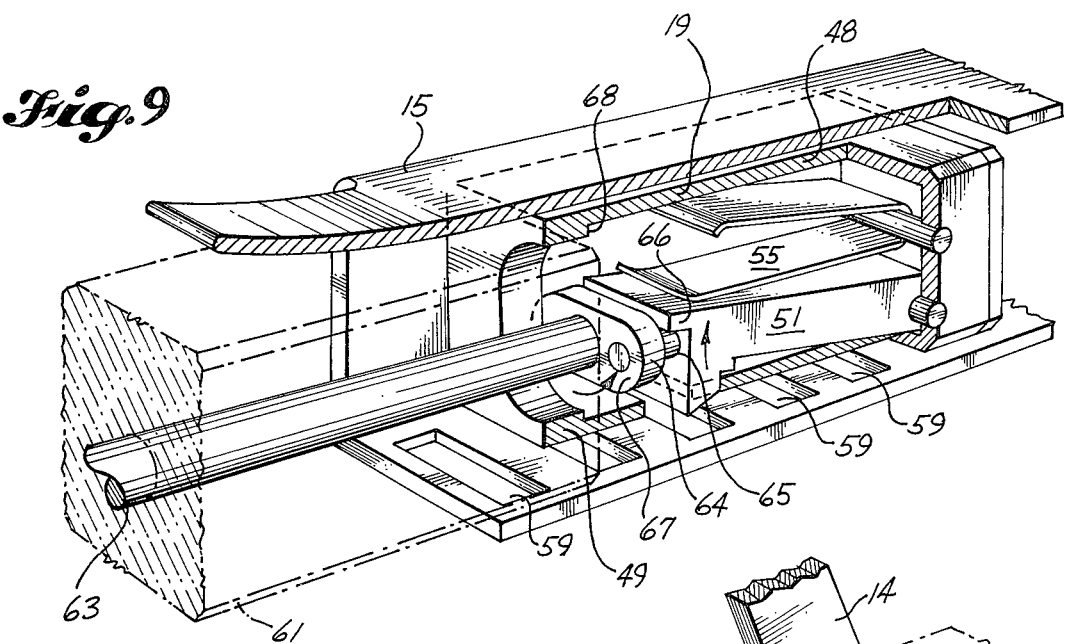
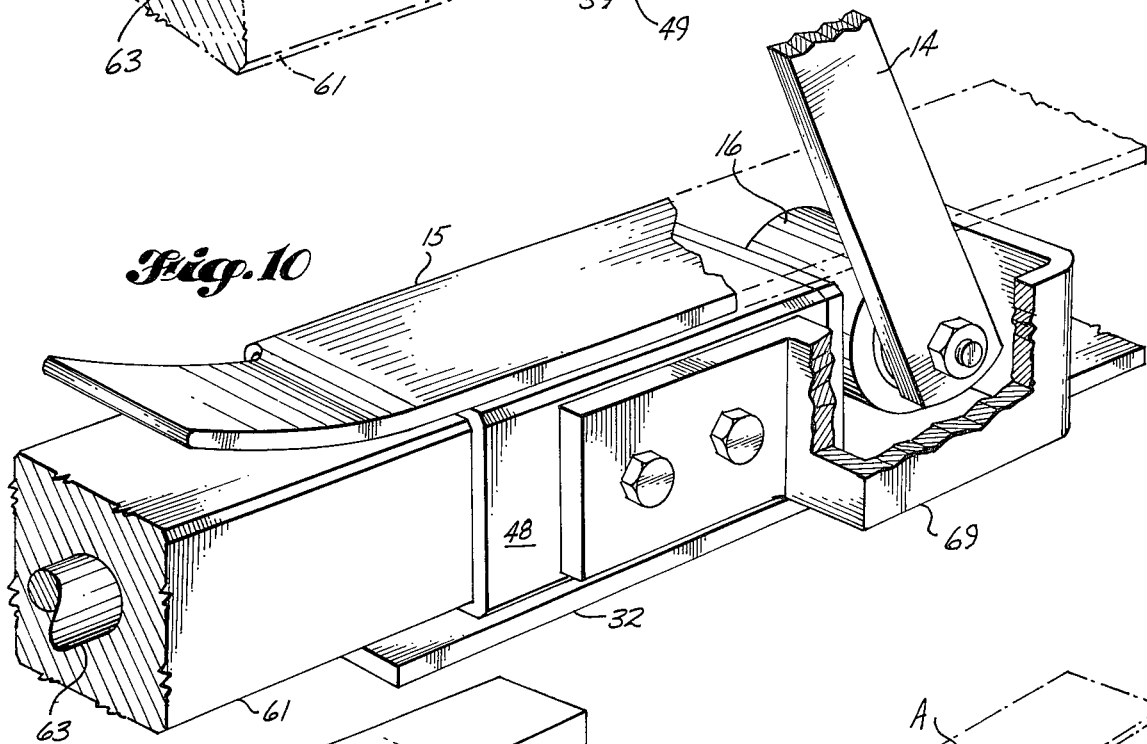
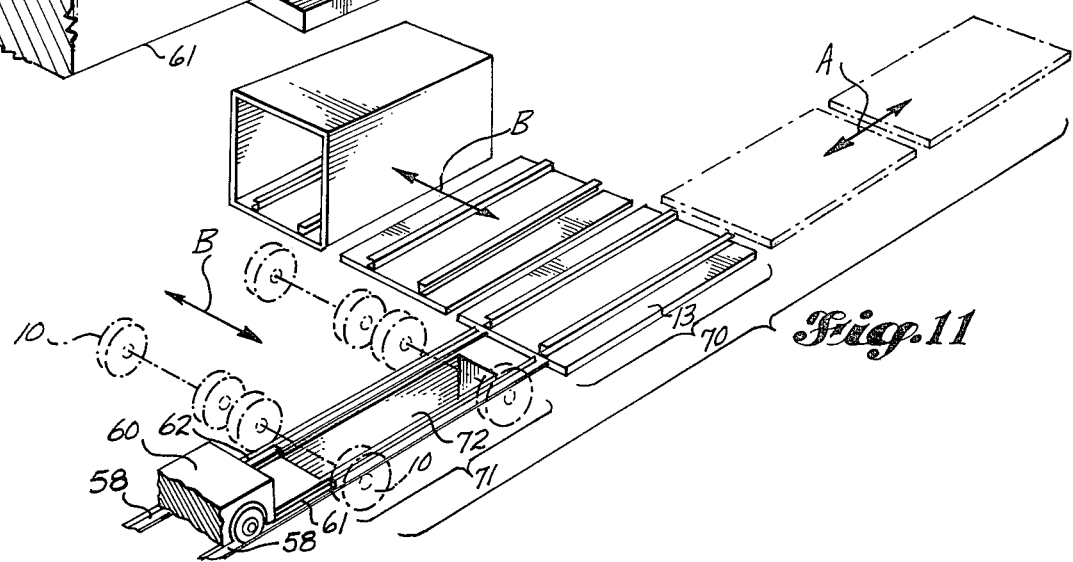

VEHICLE TIE-DOWN METHOD AND APPARATUS

BACKGROUND OF THE INVENTION

This invention relates generally to the field of transportation of vehicles by rail, ship, truck and, more particularly, to the transportation of wheeled vehicle by air. For all modes of transport it is necessary to fasten (tie-down) the vehicles to some structure to hold them in place, out of contact with each other and surrounding structure, under the inertial loads and associated displacements caused by various accelerations experienced by the transport. The accelerations include starting, stopping, turning and all manner of bumping, jolting, and the like.

Aircraft cargo is usually "containerized" (put in a container) or "palletized" (fastened to a pallet) to facilitate handling the cargo with standardized equipment and to facilitate securing the cargo in the airplane using the standardized cargo handling and restraint equipment built into the airplane.

One of the prime reasons for transporting vehicles by air is the economic benefit achieved by the shortening of time of transportation, which in turn allows keeping smaller inventories of vehicles at distribution centers and dealers. To be consistent with the saving of time by using air transportation, it is necessary to load and unload the vehicles expeditiously, taking best possible advantages of the time savings afforded by automation of the loading and unloading. Much of the equipment for such automation could be adapted from equipment developed for modes other than air transportation. However, it is particularly important to air transportation that the equipment be light, compact, and require a minimum of access space around the vehicles. Tie-down equipment developed for other transport modes is not readily adaptable to these requirements and to rapidly and automatically tying vehicles down to pallets or to the bases of containers.

The Vehicle Positioning and Restraint Apparatus of U.S. Pat. No. 3,738,481 shows apparatus which is specifically adapted to rapid automatic tie-down of wheeled vehicles to the floor or base of a carrier, specifically a shipping container. The apparatus comprises three rails attached to the floor of the container and three devices which connect the vehicle to the rails and restrain the vehicle against up and down, lateral and longitudinal motion with respect to the rails and container. The restraints are rigid with the exception of some resilience longitudinally. Also, as the vehicle is installed its suspension system springs are compressed, resulting in a tension preloading in the tie-down apparatus. In such a situation any upward vertical acceleration of the carrier, caused by roughness of the road or rails, for example, will react with the inertia of the vehicle and tend to reduce the preload in the connection devices. Great enough accelerations will, in fact, overcome the preload and cause compression loads on the devices. Since there is no resilience in the vertical restraint, these load changes will cause unacceptable sharp, jolting loads on the vehicle, connection devices, and rails. This problem can be minimized by designing the apparatus to produce higher preloading of the tires, springs, and apparatus. However, higher preloading has the disadvantages of increasing the forces required for installing and removing the vehicle and requiring stronger, heavier apparatus. This second disadvantage is of particular concern to air transportation of vehicles.

Another facet of this prior art approach is that it requires separate sets of rails and connection fittings for each type of vehicle to be transported. This is severely disadvantageous in terms of costs for design, construction, inventorying, parts handling, and record keeping.

The apparatus in U.S. Pat. No. 3,841,235, "Wheeled Vehicle Tie-Down Device", comprising rails, cables and winches, is satisfactorily adjustable. However, it does not lend itself to automated use since four cables must be each attached manually to the vehicle after it has been placed on the support for shipment.

In this apparatus also the tie-down involves preload tension in the tie-down cables and compression of the vehicles' suspension system springs and tires. Since the cables are angularly situated between the vehicle and rails, vertical and horizontal or combined inertial loads on the vehicle, due to roadway roughness and carrier operation, which exceed the preload will cause the cables to go slack and then snap taut when the inertial loads are relieved. The resulting shock loads are undesirable and may require the apparatus to be stronger and heavier than desirable for air transport purposes. In addition, costly space is required around the vehicle for access for attaching and/or adjusting the apparatus. Also, each pallet or floor must be equipped with "active" apparatus, such as winches. This tends to increase costs and weight.

United States Pat. No. 3,140,850, "Vehicle Tie-Down Apparatus"; 2,024,444, "Car Loading Device"; and 3,566,804, "Jack for Adjusting Cargo Hold-Down Apparatus" all show apparatus similar in principle to that of U.S. Pat. No. 3,841,235, discussed above, and the discussion applies to these three patents as well, with the exception that U.S. Pat. No. 2,024,444 shows a spring loaded turnbuckle in each tie-down element (chain). Since these elements are angled at approximately 45° to vertical, the springs provide for resilience both vertically and longitudinally. However, the operation is fully manual, including hook-up of the elements and adjustment, and, as stated, springs are required in each tie-down element. For air transport of vehicles this apparatus is undesirably complex and time consuming. It would also require considerable space around the vehicles for access for attachment and adjustment of the apparatus.

SUMMARY OF THE INVENTION

An object of the subject invention is to provide a vehicle tie-down method and apparatus which is not subject to these and other of the prior art, particularly when applied to air transportation in which saving time and saving weight have critical significance.

It is another object to provide such apparatus which is compact and low in weight and cost while being rugged and reliable.

It is another object to provide such apparatus which permits rapid loading and automatic tie-down of the vehicular freight.

The present invention achieves these and other objects in apparatus which includes two rails situated longitudinally and parallel on the shipping platform (either a pallet or the floor of a container), and links for connecting the vehicle to the rails. Each of the links are detachably pivoted at one of their ends to the vehicle, two near one end and two near the other, and engage the rails, as the vehicle is moved onto the platform, by rollers pivoted to their other (lower) ends. The length of the links is such that with the vehicle at its normal height from the supporting surface the rollers will engage the rails while hanging vertically from their pivoted attachments.

The rails are fitted with spring-loaded stops which can be installed in a number of positions longitudinally to accommodate different vehicle lengths. The stops operate horizontally and are contacted by the two rollers on the links near the advance end of the vehicle. A second pair of stops is subsequently inserted, one into each rail, to engage the rollers of the trailing set of links. These stops are inserted by the ground equipment which then forces the stops and trailing link rollers forwardly toward the advance link rollers. As the sets of links pivot toward each other under this force, the vertical spacing between their ends decreases so that the vehicle's suspension springs and tires are compressed and also the advance rollers compress the spring loaded stops. When a predetermined set of load conditions is established, the second pair of stops is locked into position by the inserting machine ground equipment, which is then removed. The stops can be locked in a range of positions to further provide adjustability for accommodating a range of vehicle characteristics. For removing the vehicle, the ground equipment re-engages the trailing locks and applies force enough to unload them, then unlocks and removes them so that the vehicle can then be removed and the links detached for re-use. In an alternate embodiment the ground equipment handles the lock-stops and also is used to install and remove the vehicle using longitudinal engagement of the ground equipment and rollers of the trailing (aft) links.

Restraint of the tied-down vehicle is resilient both vertically and horizontally because of the angularity of the links, the resilience of the vehicle's wheels and tires, and the resilience of the spring loaded stops. This resilience effectively eliminates any shock loads due to inertial effects within the design load range, so that the tie-down equipment can be compact and relatively light in weight. The tie-down operation is, in this example, automated with the exception of the manual attachment and removal of the links. Accordingly, the tie-down can be performed rapidly and uniformly. Also, the adjustability of all the stops and the variation of the load applied when setting the trailing locks enables a given set of equipment to accommodate a variety of vehicles. The apparatus is relatively simple and rugged and light in weight.

BRIEF DESCRIPTION OF THE DRAWINGS

FIG. 1 is a fragmental perspective view of an example of a tie-down apparatus constructed in accordance with the principle of the present invention in which the frame and wheels of a vehicle are shown tied down to the floor of a shipping container or to a pallet, the vehicle frame and wheels being shown in phantom.

FIG. 2 is a perspective view of a tie-down link assembly and shows details of the vehicle frame.

FIG. 3 shows details of the roller and the cross section of a rail.

FIG. 4 is a perspective view of a spring loaded stop, partially cut away to show the construction.

FIG. 5 is a cross-sectional view of a spring loaded stop at the point of attachment to a rail.

FIG. 6 is a perspective view of a trailing stop, partially cut away to show its details of construction.

FIG. 7 is a perspective view which illustrates an example of equipment components of the invention.

FIG. 8 is a perspective view which shows details of the apparatus at the end of probes on the ground equipment illustrated in FIG. 7.

FIG. 9 is a partially cut-away perspective view illustrating the ground equipment engaged with a lock-stop assembly.

FIG. 10 is a similar view showing a lockstop assembly adapted to engage a link roller to enable the ground equipment to on-load and off-load the vehicle.

FIG. 11 is a perspective view showing the general arrangement of the subject apparatus and associated equipment.

DETAILED DESCRIPTION OF THE INVENTION

Referring to FIG. 1, the example of the invention illustrated includes a wheeled vehicle 10, represented in phantom by elements of its underframe 11 and four wheels 12. Vehicle 10 is shown tied-down to a pallet 13 (or floor of a shipping container) by link assemblies 14, pivoted to the underframe 11 at their upper ends, and engaging channel rails 15 by roller assemblies 16 attached to the lower ends of the respective link assemblies 14. Roller assemblies 16, and thereby the vehicle 10, are held in longitudinal position by spring loaded stops 17 and 18, one in each rail 15 near the end toward which the vehicle 10 was moved as it was advanced onto the pallet 13 (the advance position), and two lockstop assemblies, 19 and 20, located one each in rails 15 near the end first approached by vehicle 10 as it advanced onto floor 13 (the trail position).

Referring to FIG. 2, each link assembly 14 includes an arm 21, a pivot pin 22 near its upper end and a roller assembly 16 near the other lower end. Pivot pin 22 is fitted with a key pin 24. When a link assembly 14 is attached to underframe 11, the assembly 14 is positioned so that pin 22 and key pin 24 fit through the specially shaped hole 25 in frame element 11. This angular orientation of the pin 22 with respect to the hole 25 is not used in operation and therefore key pin 24 retains link assembly 14 in pivotal attachment to frame element 11 during operation.

The roller assembly is shown in section in FIG. 3. Roller assembly 16 comprises a rim 23, bearing rollers 26 and an inner race 27, all held in place and attached to arm 21 by a shoulder bolt 28, a washer 29 and a nut 30.

FIG. 3 also illustrates the position of each of the roller assemblies 16 relative to rails 15 as the vehicle is advanced onto the pallet 13, with rim 23 clear of the vertically juxtaposed channel sides or flanges 31 and 32 of rail 15. Rail 15 is attached to pallet 13 at a plurality of points by bolts 33 passing through the side channel 32 and secured with washers 34 and nuts 35, the latter being countersunk as desired. Holes 36 in side flange 31 provide access for machining holes 37 in the pallet surface and for installing the tie-down system.

Advance end, spring loaded stops 17 and 18 may be identical and, as illustrated in FIGS. 4 and 5, each includes a body 38, a plunger 39, a bumper 40, a coil spring 41 and a retaining sleeve 42 inserted and retained in a hole 43 in body 38. The assembly is shown partially compressed as it would be with the vehicle loaded on the pallet, as explained later.

The stops are installed in the rails by bolts 44, washers 45 and nuts 46 in any of a plurality of holes 47 in the base side of the rails 15. (Also see FIG. 1.) The multiplicity of holes 47 provides adjustment to accommodate a variety of vehicles with each set of tie-down equipment.

FIG. 6 illustrates one of the identical trail end lock stop assemblies 19 and 20, shown installed in a segment of a rail 15. The assemblies 19 and 20 each include a body 48, generally square in cross section and hollow. The trail end 49 of body 48 has a vertically eccentric hole 50 therethrough centered on the longitudinal centerline of body 48. A pawl 51 is pivoted inside body 48 by a pin 52. A pawl tooth 53 extends through a hole 54 in the bottom of body 48. A compressed leaf-spring 55 biases pawl 41 downward and is held in place by a pin 56 and a cap 57 secured to the advance end of body 48. The pawl tooth 53 extends through the hole 54 and engages any of a multiplicity of slots 59 in channel side 32 of rail 15 to provide adjustability to accommodate a variety of vehicles with a specific set of tie-down equipment, as explained in more detail later.

FIG. 7 illustrates an example of the ground equipment elements of the invention for inserting and removing lock-stop assemblies 19 and 20, and for on-loading and off-loading the vehicle when desired, as explained later. A segment of pallet 13, with rails 15 attached, is shown aligned with a pair of rails 58 which guide a ground equipment carrier 60 which includes a pair of forwardly extending probes 61 and 62. Probes 61 and 62 extend in the advance direction from vehicle 60 as shown and are positioned to telescope into and out of rails 15 of a pallet 13 properly positioned as shown in FIG. 11 for the installation and removal of vehicles onto or from the pallet. Each of the probes 61 and 62 has a shaft 63 (FIG. 8), supported longitudinally within it; and shaft 63 is fitted with an eccentric, oval-shaped cam 64, sized to fit through hole 50 in end 49 of lock-stop body 48. A pin 65 is installed in part 64 and positioned so that when cam 64 is inserted through hole 50 of the lockstop assembly 19 or 20, pin 65 will position under a cam engaging lip 66 on pawl 51. Means are provided in carrier 60 to rotate shaft 63 and cam 64 ninety degrees as shown in phantom in FIG. 8.

The purpose of this is shown in FIG. 9 and discussed in more detail in the discussion of operation of the invention. In FIG. 9 a probe 61 is shown in engagement with a rail 15 and a lock-stop assembly 19. Cam 64 is shown disposed through hole 50 in the end 49 of the body 48 of the assembly and has been rotated 90° counterclockwise, facing in the advance direction. Rail 15 prevents the complete assembly 19 from rotating so that pin 65 extending from cam 64 has engaged lip 66 on pawl 51 and lifted against the spring 55, the pawl tooth 43 clear of slots 59 of lower side flange 32 of rail 15. By the same 90° rotation the trail end face 67 of cam 64 engages the inner, advance face 68 of end 49, so that assembly 19 is longitudinally restrained to move in both directions with probe 61.

FIG. 10 shows a retainer element 69 attached to body 48 of lock stop assembly 19. Retainer element 69 extends around the advance end of link assembly 14 and roller assembly 16 so that the roller assembly 16 is constrained to move in both longitudinal directions and to be carried with body 48 when the probe 60 engages and displaces the lock-stop 19. Since the link assembly is affixed to the vehicle, the retaining feature of the element 69 enables the ground equipment to move the vehicle off, that is pull, as well as onto, push, the pallet 13.

The invention is further described by a discussion of its operation. Prior to loading a vehicle onto a pallet, the positions in which to install the advance end spring loaded stops 17 and 18 will have been determined and the stops disposed accordingly. If the ground equipment is used for lock-stop insertion and removal only, a pallet is placed in the position 70, FIG. 11, to be loaded. The vehicle is placed for loading in position 71 and the four link assemblies 14 installed. This installation would be done from a pit 72 beneath the vehicle when it is in the loading position 71. The vehicle is then advanced onto the pallet 13 and link assemblies 14 in the advance positions engage the rails 15 and the vehicle is advanced until the roller assemblies 16 contact the stop assemblies 17 and 18. A lock-stop assembly, 19 and 20, is positioned at the entry trail end of each rail 15 and the ground equipment 60 is moved up so that probes 61 and 62 each engage a rail 15. Each probe then engages a lock-stop assembly by insertion of cams 64 through holes 40 and rotation of cams 64 90°. As described, this rotation renders the pawl 51 inactive and connects the lock-stops to the probes. The probes are then advanced; the lock-stops contact the roller assemblies 16 of the trailing position link assemblies 14 and force them closer to the roller assemblies 16 of the advance position link assemblies 14. This action causes the link assemblies 14 to angle toward each other in advance/trailing pairs, shortening the vertical distance between pins 22 in frame elements 11 and roller assemblies 16 engaged with rails 15.

As this distance shortens, the springs and tires of the vehicle and the springs 41 in the spring loaded stops 17 and 18 are compressed. When a predetermined level of force has been applied, the ground equipment is caused to rotate cams 64 to their normal vertical orientation, activating pawls 51. Then the ground equipment backs off and pawl teeth 53 latch into the first set of slots 59 in rails 15 that they engage. This locks the apparatus and the vehicle in loaded position. The ground equipment is then withdrawn, the counter rotation of cams 64 which activated pawls 51 having also aligned and freed the cams 64 to exit holes 50.

The loading is then complete. In this loaded condition vertical inertial shock loads are absorbed by compression and extension of the tires and springs of the vehicle and the springs 41 of the spring loaded stop assemblies 17 and 18, since the vertical displacement of the vehicle with respect to the pallet is allowed by angular displacement of links assemblies 14 with corresponding fore and aft displacement of the advance position rollers 16 and of the vehicle itself. Horizontal inertial loads are absorbed in similar fashion.

For unloading, the loaded pallet is placed in position 70, at the ends of rails 68 and appropriately aligned so that probes 61 and 62 can be inserted into rails 15 and cams 64 enter holes 50 in the lock-stop assemblies 19 and 20. A torque is applied to shafts 63 to rotate cams 64 so that pawl teeth 53 will disengage slots 59 in rails 15. However, at this point the load on the pawl teeth 53 cannot be overcome by the torque. Then force is applied by the probes 61 and 62 sufficient to advance the lock-stops 19 and 20; this unloads pawl teeth 53; the applied torque then rotates parts 64 to de-activate the pawls 51 and connect the lock-stop assemblies 19 and 20 to the probes 61 and 62. The ground equipment 60 is then backed away, removing the lock-stops 19 and 20 and relieving the loads on link assemblies 14, the wheels and tires, and the spring loaded stops 17 and 18. The vehicle is then removed from the pallet 13. Lock-stop assemblies 19 and 20 are removed from probes 60 and 61 by rotating them 90° or by rotating cams 64 90°. The link assemblies 14 are removed from the vehicle and the unloading is complete.

When the ground equipment 60 is to be used for lock-stop insertion and removal and also for moving the vehicle onto and off of the pallet 13, the operation as described above is modified as follows: When the vehicle is positioned and aligned to be loaded (position 71) link assemblies 14 are installed; and lock-stop assemblies 19 and 20 with adaptors 69 attached are engaged with the roller assemblies 16 of the link assemblies 14 installed in the trailing positions. Ground equipment 60 is then advanced so that probes 60 and 61 engage lock-stop assemblies 19 and 20, deactivating pawls 51 and becoming secured to the lock-stop assemblies as previously described. The ground equipment 60 then applies force to advance the vehicle onto the pallet 13; and as it advances, the advance position roller assemblies 16 engage rails 15; and subsequently the lock-stops 19 and 20 and roller assemblies 16 of the trailing position link assemblies 14 engage rails 15. The tie-down loading and locking is then the same as described above.

For unloading the vehicle, the operation is the same as described above except that after the lockstops 19 and 20 have been engaged by probes 60 and 61 and unlocked (pawls 51 deactivated), the ground equipment 60 is backed away and moves the vehicle with it to position the vehicle in the loading/unloading position 71. Then lock-stop assemblies 19 and 20 and the four link assemblies 14 are removed to complete the unloading.

FIG. 11 shows one general layout and flow plan for utilizing the subject apparatus. Loading/unloading flow is in the direction of arrow A. Pallets or containers 13 and vehicles 10 are routed transversely, as indicated by the lateral arrows B, to the loading/unloading line, by conventional apparatus, to and from positions 70 and 71 respectively.

The apparatus and its operation as described overcome the shortcomings found in prior art equipment. Resilience to absorb vertical and horizontal inertial shock loads is provided without the need for tie down loads which exceed the highest expected inertial loads, thus allowing the apparatus to be more compact and light in weight.

The apparatus incorporates adjustment features which enable it to accommodate a range of vehicles of differing characteristics.

Access requirements are kept to a minimum. A container just large enough to accommodate the vehicle and its displacements, vertical, longitudinal and sidewise, is adequate since loading and unloading are accomplished entirely form the open end of the container.

The apparatus is simple, rugged, and reliable. The links are solid, as compared to requiring resilience in each. There is no "active" machinery required in each pallet or container.

two variations of embodiment of the subject invention have been described as examples only; and other variations and modifications are possible in light of the disclosures made herein. Therefore, the scope of this invention should be limited only by the appended claims.

What is claimed is:

1. Apparatus for tying-down a wheeled vehicle to a platform having edges, said vehicle having tires and resilient suspension members, said apparatus comprising:
    at least one rail attached to said platform between said vehicle and said platform and adapted for attachment of a first stop means and installation of a second stop means;
    first and second link assemblies for attaching said vehicle to said rail;
    each of said link assemblies comprising:
    vehicle attachment means for pivotally removably connecting said link assembly to said vehicle at spaced apart points aligned with said rail;
    platform attachment means for removably engaging said rail and being free to move along said rail while engaging it;
    tension means connecting said vehicle attachment means to said platform attachment means, having a length such that said first and second link assemblies are in essentially vertical positions when pivotally connected to said vehicle and movably engaged with said rail;
    placement means for moving said rail engaging platform attachment means of said second link assembly to a position closer to said rail engaging platform attachment means of said first link assembly while both are engaged with said rail, so that said first and second link assemblies are pivoted out of said essentially vertical positions into angled positions so that the vertical distance between said pivotally connecting vehicle attachment means and said movable, rail engaging platform attachment means is decreased, causing said tires and suspension members to be effectively compressed;
    locking means for removably securing said rail engaging platform attachment means of said second link assembly to said rail in a predetermined longitudinal disposition with respect to said first link assembly along said rail.

2. The apparatus of claim 1, wherein said placement means for moving said rail engaging means of said second link assembly and said locking means for securing said rail engaging means of said second link assembly to said rail comprise:
    a first stop means attachable to said rail in any of a plurality of positions along said rail to limit the motion of said movable rail engaging means of said first link assembly away from said rail engaging means of said second link assembly;
    a second stop means installable and lockable in said rail in any of a plurality of positions along said rail to adjust the distance of said rail engaging means of said second link assembly from said rail engaging means of said first link assembly and to limit said distance once said stop means are installed:
    installation means for installing said second stop means.

3. The apparatus of claim 2 in which said first stop means has a longitudinal axis oriented parallel to said rail when said second stop means is installed and in which said first stop means is effectively compressible along said axis.

4. The apparatus of claim 2 in which said rail includes a plurality of slots spaced therealong, and in which said second stop means further comprises:
    a body and a pawl having a tooth and a lip pivotally carried by said body, said tooth being adapted to engage any one of said slots; spring means adapted to urge said pawl tooth into latching engagement with said one of said slots;

access means for said pawl lip of the character to cooperatively receive said installation means for said second stop means.

5. The invention as set forth in claim 4 in which said installation means comprises:

probe means of the character to be extended and retracted along said rail from beyond one of said edges of said platform and having means for insertion through said access means and for attaching said second stop means to said probe means for engaging said lip of said pawl for retracting said pawl tooth from one of said slots in said rail against the urging of said spring means and for allowing said spring means to again urge said pawl tooth into engagement of one of said slots and to detach said second stop means from said probe means.

6. The apparatus as claimed in claim 5 which further comprises retaining means attached to said body of said second stop means for interconnecting said second stop means and an adjacent movable, rail engagement means, so that when said second stop means is attached to said probe means, said extension and retraction of said probe means along said rail causes said second link assembly and said vehicle to be moved along said rail and said platform.

7. Apparatus for tying-down a wheeled vehicle, having a longitudinal axis, to a platform, said vehicle having tires and suspension springs and a frame with at least two longitudinally spaced apart pivot holes each having an axis, said said pivot hole axes being horizontal and transverse to said longitudinal axis, said apparatus comprising:

at least one rail having a first end, a second end, a flange and being attached to and positioned longitudinally of said platform;

at least two link assemblies each comprising an arm having a first end, a second end and a longitudinal axis, a pivot pin having an axis and attached to said first end and a roller assembly having an axis and attached to said second end, said pivot pin axis and said roller assembly axis being transverse to said arm longitudinal axis; said pivot pins engaging said pivot holes in said frame; said roller assemblies engaging said flange of said rail with freedom to move longitudinally of said flange, said link assemblies being positioned essentially vertically and tying said vehicle to said platform;

means for forcing said free-to-move-longitudinally roller assemblies toward each other so that said link assemblies are displaced angularly toward each other out of said essentially vertical positions with the vertical distance between said axes of said pivot pins and said axes of said roller assemblies being decreased, forcing said tires and said suspension springs to be compressed; and means for locking said link assemblies in said angularly-displaced-toward-each-other positions.

* * * * *